Figure 1:
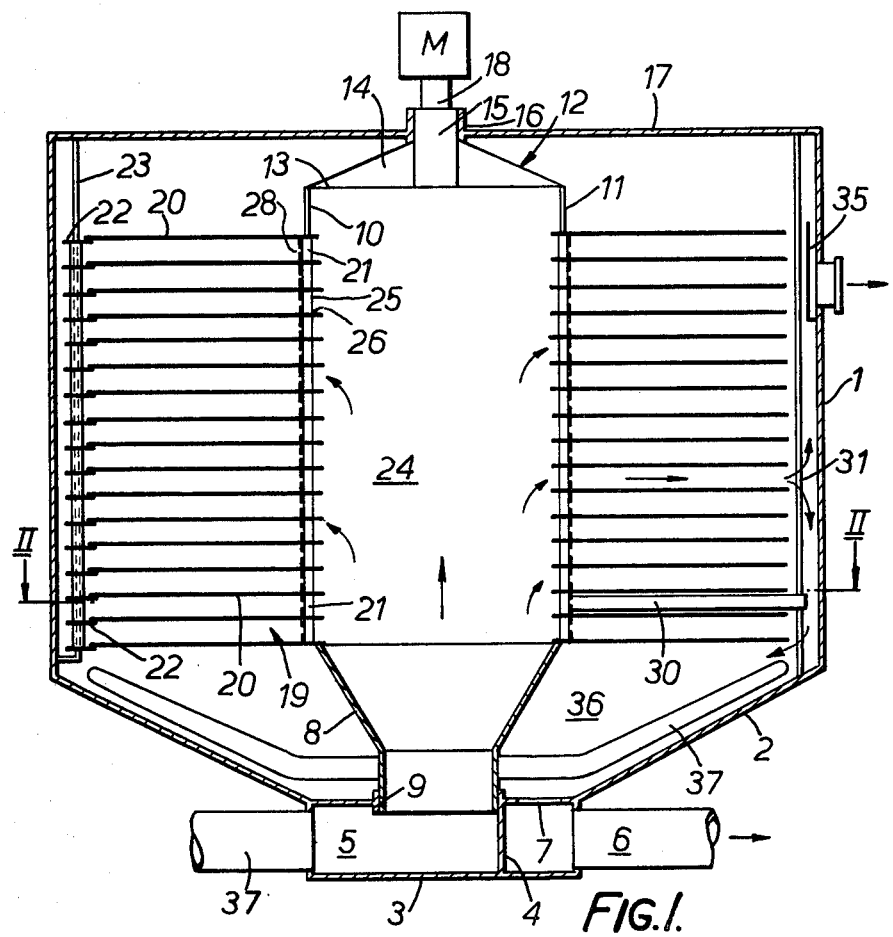

United States Patent [19]

Skarheim et al.

[11] 4,086,169
[45] Apr. 25, 1978

[54] LAMELLA SEPARATOR FOR SEDIMENTING (GRAVITY SEPARATING)

[75] Inventors: Hans Petter Skarheim, Hygge; Torbjørn Damhaug, Oslo, both of Norway

[73] Assignee: Thune-Eureka A/S, Tranby, Norway

[21] Appl. No.: 724,219

[22] Filed: Sep. 17, 1976

[30] Foreign Application Priority Data

Sep. 18, 1975  Norway .................................. 753186
Aug. 30, 1976  Norway .................................. 762978

[51] Int. Cl.² ............................................. B01D 21/24
[52] U.S. Cl. .................................... 210/519; 210/521; 210/528
[58] Field of Search ................ 210/396, 397, 519–522, 210/528

[56] References Cited

U.S. PATENT DOCUMENTS

| | | | |
|---|---|---|---|
| 1,219,796 | 3/1917 | Atkins | 210/397 X |
| 1,231,409 | 6/1917 | Moore | 210/521 |
| 1,718,871 | 1/1929 | Nordell | 210/522 X |
| 1,817,649 | 8/1931 | Rumsey | 210/522 |
| 3,333,700 | 8/1967 | Coleman | 210/397 X |
| 3,370,714 | 2/1968 | Trawinski | 210/521 X |

*Primary Examiner*—John Adee
*Attorney, Agent, or Firm*—Young & Thompson

[57] ABSTRACT

A lamella separator for sedimenting (gravity separating) comprises a lamella stack in which the lamellae are disposed horizontally. At least one sludge-removing device is arranged for cooperation with each lamella. A relative movement between each lamella and its associated sludge-removing device is effected.

14 Claims, 7 Drawing Figures

LAMELLA SEPARATOR FOR SEDIMENTING (GRAVITY SEPARATING)

The invention concerns a lamella separator for sedimenting (gravity separating), that is, a device for lamella sedimenting of, for example, waste water.

The principle on which lamella sedimentation is based is that one uses plates or lamellae in the sedimenting unit in order thereby to increase the effective sedimentation area. Today's common lamella separators utilize sloping lamellae so that one can obtain an even distribution of the fluid, and the sludge can be removed by its sliding down the sloping lamellae and collected in a sludge pocket. With sloping lamellae, the effective sedimentation area is reduced, since the effective area is the sum of the horizontal projections of the sloping lamellae.

The object of the present invention is to provide a lamella separator in which the lamellae are disposed horizontally, thereby increasing the effective sedimenting area, while at the same time achieving the desired even distribution of fluid and the necessary sludge removal, and a particular aim is to make possible continuous operation. With the devices known at present, one must reckon with frequent operating stops as a part of normal operation, because the sludge must be removed. This is due to the fact that more and more sludge is gradually accumulated, even with sloping lamellae. According to the invention, therefore, a lamella separator for sedimenting (gravity separation) is provided which is characterized by comprising a lamella stack placed along the vertical axis of a container, said lamella stack having lamellae disposed horizontally and mutually spaced, and the unit having a central, through opening, at least one sludge-removing device for each lamella, a device for effecting relative movement between each lamella and its associated sludge-removing device, and an intake and an outlet in the container for the fluid which is to be treated, as well as an outlet in the container for the sludge which has been separated out.

The fluid which is to be treated is forced to travel between the lamellae. The flow direction can be from the central, through opening and outwards, or from the outside and in toward the central, through opening. From the point of view of construction, it is deemed desirable to provide said relative movement between each lamella and its associated sludge-removing device by mounting the lamella stack in such a way in the container that it can be rotated on said vertical axis. These rotational movements are of course very slow, for example, four complete turns per hour. With such a slow rotational movement, it will in practice be possible to let the fluid being treated flow outwardly or inwardly between the lamellae, as mentioned above. The desired flow direction can be achieved with simple modifications of one and the same basic construction.

The lamella separator can advantageously have a narrow slot opening at the inner circumference of each lamella space. These slots are conducive to achieving equal water velocity (height distribution in the container). These slots will have an especially advantageous effect when the flow runs from the outside and in because an occasional large particle in the fluid will not usually come into conflict with the narrow slot, since it will not be carried that far but will rather be deposited in the sludge.

A simple and effective structural embodiment is characterized by the lamellae's being held mutually spaced at the central opening by means of vertical rods on which spacer bushings have been threaded. Structurally speaking, it is also advantageous to let the narrow slot be formed by two annular bands which are fastened to said spacer bushings, the bands being mutually spaced vertically so that they form a horizontal slot between them.

The outer portions on the circumference of the lamellae are advantageously supported in a sliding manner by support pieces which are suspended on vertical rods disposed outside the lamella stack's outer circumference.

The sludge-removing device can be of whatever suitable type one wishes to use, but a scraping device is preferred. When employing a scraper in each lamella space, and especially in the case where the fluid being treated flows from the inside and out toward the periphery, it is advantageous to dispose an adjustable radial wall in the annular space between the wall of the container and the lamella stack, in front of the scraper. This results in a subdued region in front of the scraper so that undesired whirlpool formations can be avoided.

The most practical shape for the bottom of the container is conical. The rotatable lamella stack can then advantageously be equipped with a sludge scraper that scrapes off the inside of the conical bottom, and an opening for sludge disposal is arranged in said bottom.

Depending on the flow direction which is chosen for the fluid being treated in the lamella separator, the central opening in the lamella stack is connected down to a fluid supply- or discharge pipe.

When fluid is to be supplied from the lower end, the container can advantageously be equipped with an overflow to maintain the fluid level over the lamella stack. When the fluid is to be discharged in the lower portion, it is advantageous to provide the upper part of the container with an overflow intake for the fluid, and the central opening in the lamella stack is then closed at the top.

To prevent clogging of the narrow slot, it is advantageous to arrange a brush device which cooperates with said narrow slot. The brush device can advantageously be incorporated with said sludge-removing device, and takes care of keeping the narrow slot clean and open at all times.

The invention will be explained further with reference to the drawings, wherein

Figure 4:
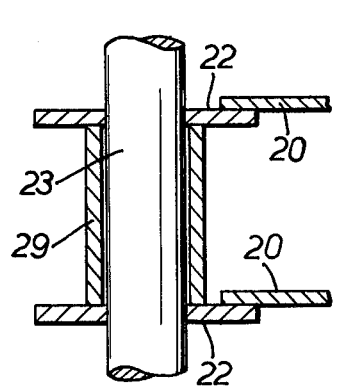
Figure 5:
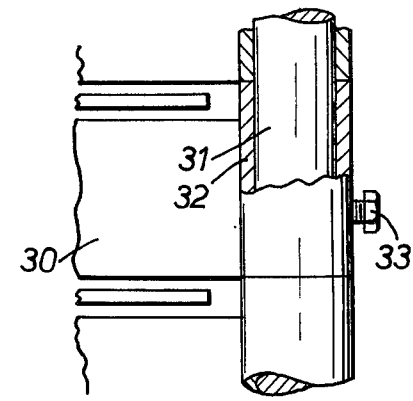
Figure 2:
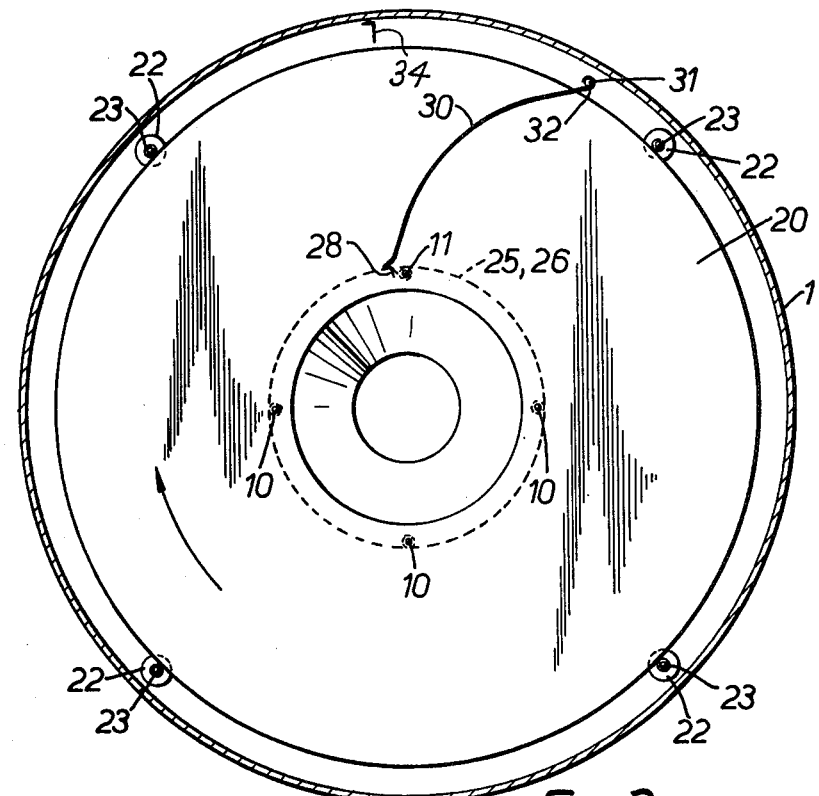
Figure 3:
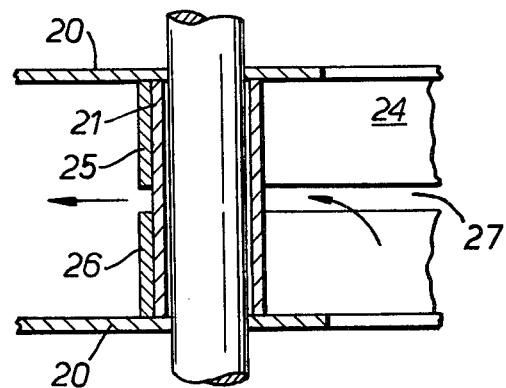
Figure 6:
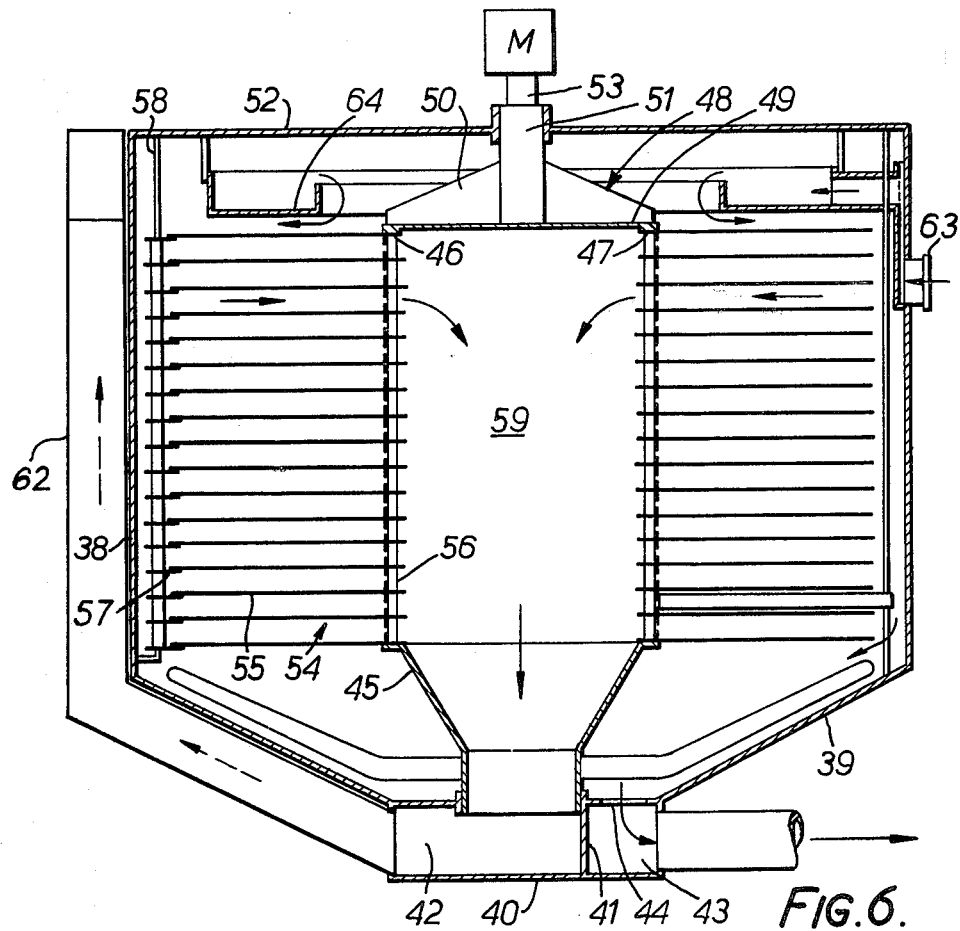
Figure 7:
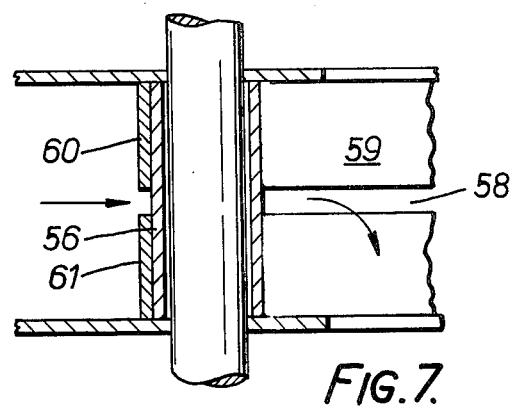

FIG. 1 shows a schematic vertical section through a lamella separator according to the invention, FIG. 2 shows a horizontal section through lines II—II of FIG. 1, FIG. 3 shows on an enlarged scale a detail section through the intake to each lamella space, that is, the space between two adjacent lamellae, FIG. 4, in a similar way, shows a detail section through the outer lamella region where the lamellae are slidingly supported from below, FIG. 5 shows a detail section of the scraper arrangement, FIG. 6 is a schematic vertical section through a second embodiment of a lamella separator according to the invention, and, FIG. 7 is a detail section on an enlarged scale through the outlet to each lamella space in the design of FIG. 6.

In FIG. 1 is shown a container 1 having a conical bottom 2. This conical bottom 2 is connected to a box 3, which is divided by a wall 4 into an intake chamber 5 for the fluid which is to be lamella-sedimented, and an outlet chamber 6 for the sludge. The outlet chamber 6 is connected to the interior of the container 1 through a sludge opening 7. The intake chamber 5 is connected to the interior of a conical body 8 which, in a way not shown, is pivotably mounted at 9 in the bottom of the container, in this case in that part of the container's bottom which also forms the top wall of the intake chamber 5. The conical body 8 is suspended by means of vertical rods 10, 11 from an upper support part 12 which in the main consists of a plate 13, braces 14 and a central journal 15, which, in a manner not shown, is pivotably mounted at 16 in the container's top wall 17. Journal 15 is extended by an axle 18 connected to a drive motor M.

A lamella stack 19 is built up by ring-shaped lamellae 20 being threaded on vertical rods 10, 11, with spacer bushings 21 disposed in between. At the outer periphery the lamellae are held mutually spaced by means of support pieces 22 which are suspended from vertical rods 23. These vertical rods 23, of which only one is shown on FIG. 1, are fastened to the container 1 in a way not illustrated.

FIG. 3 illustrates how the spacer bushings 21 between adjacent lamellae 20 are also used to construct a slot opening from the central, through opening 24 in the lamella stack and into the respective spaces between the lamellae 20. On the side which faces toward the central through opening 24, two annular elements, 25 and 26, respectively, are welded to the bushing 21. These form a slot 27 between them. In this way, a slot opening is formed for the fluid which rises up through the central opening 24 and flows radially out into the respective spaces between the lamellae 20, as suggested by the arrows in FIG. 3.

FIG. 4 shows how the lamellae 20 can advantageously be slidingly supported from below along their outer circumference by means of the previously mentioned support pieces 22. These support pieces 22 are threaded onto vertical rods 23 and held mutually spaced at a distance corresponding to the distance between two adjacent lamellae 20 by means of spacer bushings 29 which also are threaded on the rods 23. The support pieces 22 can be coated with a suitable friction-reducing agent, or they can themselves be made of a material which gives little friction against the lamellae 20.

In each space between adjacent lamellae 20, at least one sludge-removing device is provided. In the embodiment example, the sludge-removing device is formed as a scraper 30. FIG. 1 shows only one such scraper, in the next-to-the-bottom lamella space, but it should of course be understood that at least one such scraper is to be found in each of the respective parallel lamella spaces. As is evident from FIG. 2, the scraper 30 is curved so that it is adapted for the accelerated radial movement and the amount of sludge. Innermost, that is, in the region of the central intake, there will be relatively little sludge, while outermost there will be relatively much sludge. The scraper is mounted on a vertical rod 31 which is fastened to the container 1. An example of how this can be done is shown in FIG. 5. Outermost on each scraper, a bushing 32 is provided which, for example by means of a screw 33, can be fixed in the desired position on the rod 31. The rod 31 can, in a manner not shown, be pivotably mounted in the container 1, in order to make it possible to regulate the position of the scrapers, for example, to swing the scrapers out into the annular space between the lamella stack and the container, so that all of the scrapers can thereby be lifted straight up. It is advantageous that each scraper 30 cooperate with a radial wall 34 which, in a way not shown, is adjustably fastened to the interior of the container 1, in the annular space between the lamella stack and the container wall. In this way, between the radial wall 34 and its associated scraper 30, a sludge region is formed, the extent of which can be adjusted as needed. The rate at which sludge is removed can be made independent of the nature of the sludge in two ways. One possibility is to regulate the relative movement or speed between scraper and lamella. The other possibility is to change the number of scrapers. Both possibilities can of course also be combined.

It is also possible to achieve a corresponding scraping off by rotating the scrapers while the lamella stack remains immobile. This can be done in two ways, either by a rotation of the center or by a rotation where the scrapers are fastened to a frame which moves around the lamella stack. At the outermost edge of each scraper 30, a small brush 28 is provided which enters the narrow slot 27 and keeps it clean and open.

The container 1 has an overflow 35 which assures that the desired fluid level is maintained in the container 1. This overflow 35 can of course be adjustable. Details of this are not shown, because such constructions ought to be obvious for a person skilled in the art.

In the lower part of the container 1, a sludge chamber 36 is formed, the bottom of which is limited by the container's conical bottom 2. This conical bottom 2 has, as mentioned previously, a lower opening 7 which leads down to the sludge outlet 6. The bottom of the sludge chamber 36 is scraped by sludge scrapers 37 which are mounted on the conical body 8, said conical body forming a part of the lamella separator's rotating unit.

The lamella separator works in the following manner.

The fluid which is to be lamella-sedimented enters through a pipe 37 into the intake chamber 5, and then rises up through the central opening 24 in the lamella stack 19. The lamella stack 19, which in the main comprises a conical body 8, lamellae 20 and an upper support structure 12, rotates slowly as this happens, for example, with four complete turns per hour. The motor M drives the rotation. The fluid rises up as suggested by the arrows and flows radially outward, through the slot openings 27 in each lamella space, and during this sludge is deposited on the respective lamellae. The sludge is brought out into the annular space between the lamella stack and the container wall by means of the scrapers 30, and then goes down into the sludge chamber 36. The remaining fluid flows out through the overflow 35.

The large central opening provides for even distribution, and this even distribution is further improved through the use of the slot openings into the respective spaces between lamellae. The lamella separator is well suited to continuous operation, because one avoids the otherwise common operational halts for removing sludge. Instead of the scrapers shown, other suitable sludge-removing devices can of course be used, such as suction apparatus or the like.

The lamella separator can, after simple modification, be used for different purposes, for example, for flotation separating, both by allowing lighter materials to float up and thereby be separated from the fluid phase and by using pressure-injected undissolved materials and dispersed air. The modifications necessary would then consist of changing the construction of the bottom and providing surface grooves corresponding to those used in common flotation tanks. The stack of plates and scraping apparatus would require few or no changes.

The embodiment in FIG. 6 has in many of its features the same structural construction as the design of FIG. 1. The differences which do exist are due to the fact that one is in this case working with a flow of the fluid to be treated from the outside and in into the spaces between the respective lamellae in the lamella stack.

The container 38 has a conical bottom 39. This conical bottom 39 is connected to a box 40 which is divided by the wall 41 into an outlet chamber 42 for the fluid which has been treated, and an outlet chamber 43 for sludge. Outlet chamber 43 is connected to the interior of the container through a sludge opening 44. Outlet chamber 42 is connected to the interior of a conical body 45 which, in a way not shown, is pivotably mounted in the bottom of the container, in this case in that part of the container bottom which at the same time forms the top wall of outlet chamber 42. The conical body 45 is suspended in an upper support part 48 by means of vertical rods 46, 47, said support part 48 consisting in the main of a plate 49, braces 50 and a central journal 51 which, in a way not shown, is rotatably mounted in the top wall 52 of the container. Journal 51 is extended by an axle 53 connected to a drive motor M.

A lemella stack is constructed by threading ring-shaped lamellae 55 on vertical rods 46, 47, with spacer bushings 56 in between. At their outer edges, the lamellae 55 are kept mutually spaced by means of support pieces 57 which are suspended from vertical rods 58. These vertical rods, of which only one is shown on FIG. 6, are fastened to the container in a way not shown.

FIG. 7 shows how the spacer bushings 56 between adjacent lamellae 55 at the same time are used to construct a slot opening 58 form each respective space between lamellae 55 and out into the central through opening 59 in the lamella stack. On the side facing away from this central through course 59, two annular elements 60 and 61, respectively, are welded to the bushing 56. A slot 58 is thus formed between 60 and 61. In this way, a slot opening is formed for the fluid flowing from the outside and in between the respective lamellae in the lamella stack and then into the central opening 59, as suggested by arrows in FIG. 7.

Sliding support of the lamellae along the outside circumference occurs in the same manner as in the embodiment of FIG. 1, and the sludge removing device is also provided in the same way, see FIGS. 4 and 5, respectively. The section of FIG. 2 is also representative for a corresponding section through the embodiment shown in FIG. 6.

From the outlet chamber 42, a pipe 62 extends up along the exterior wall of the container, to carry off the fluid that comes out of the lamella separator.

In the container wall, there is an intake 63 for the fluid to be treated. This intake is connected to a ring-shaped distribution box 64 disposed uppermost in the container. The fluid to be treated enters through the intake 63 and flows up into the distribution box 64 and out over its inner edge, as suggested by the arrows at the top of the container. The plate 49 in the support structure for the lamella stack closes the central opening 59, so that the fluid is forced to flow radially outward and down along the walls of the container and in between the lamellae, where the sludge is separated out.

Otherwise, the mode of operation is the same as that described previously for the embodiment of FIG. 1.

Havng described our invention, we claim:

1. Lamella separator for sedimenting, characterized in that it comprises a lamella stack disposed on the vertical axis in a container, means mounting the lamella stack for rotation about its vertical axis in the container, said lamella stack havng horizontally-disposed, mutually spaced lamellae, and having a central through opening, at least one sludge-removing device for each lamella, a device for effecting a relative movement between each lamella and its associated sludge-removing device, an intake and an outlet in the container for the fluid to be treated, as well as an outlet in the container for the sludge that has been separaed out, and a radial wall in the annular space between the wall of the container and the lamella stack, in front of the scraper with regard to the direction of rotation of the lamellae.

2. Lamella separator according to claim 1, characterized in that each lamella space has a narrow slot opening at its inner circumference.

3. Lamella separator according to claim 1, characterized in that the lamellae are kept mutually spaced at the central opening by means of vertical rods on which spacer bushings are threaded.

4. Lamella separator according to claim 3, characterized in that a narrow slot opening is formed by two annular bands which are fastened to said spacer bushings between each two lamellae so as to be mutually spaced vertically above and below the slot.

5. Lamella separator according to claim 1, characterized in that the lamellae's outer circumferential portions are slidingly supported by support pieces which are suspended on vertical rods that are disposed outside the outer circumference of the lamella stack.

6. Lamella separator according to claim 1, characterized in that the sludge-removing device is a scraping device.

7. Lamella separator according to claim 1, characterized in that the bottom of the container is conical and that the rotatable lamella stack supports a sludge scraper which scrapes the insides of the conical bottom, wherein an opening for disposing of the sludge is provided.

8. Lamella separator according to claim 1, charcterized in that the lower part of the central opening in the lamella stack, below said stack, is connected to a fluid supply-pipe.

9. Lamella separator according to claim 1, and having a fluid supply from below, characterized in that the container has an overflow to maintain the fluid level over the lamella stack.

10. Lamella separator according to claim 1, and having a fluid outlet at the bottom, characterized in that the container has in its upper part an overflow inlet for fluid, and in that the central opening in the lamella stack is closed at the top.

11. Lamella separator according to claim 2, characterized by brush device cooperating with said narrow slot opening.

12. Lamella separator according to claim 11, characterized in that the brush device is incorporated in said sludge-removing device.

13. Lamella separator according to claim 1, characterized in that the lower part of the central opening in the lamella stack, below said stack, is connected to a fluid outlet pipe.

14. Lamella separator according to claim 2, characterized in that the sludge removing device is a fixed scraper that extends one between each two lamellae, and a brush on the end of each scraper cooperating with said narrow slot opening.

* * * * *